Figure 1:
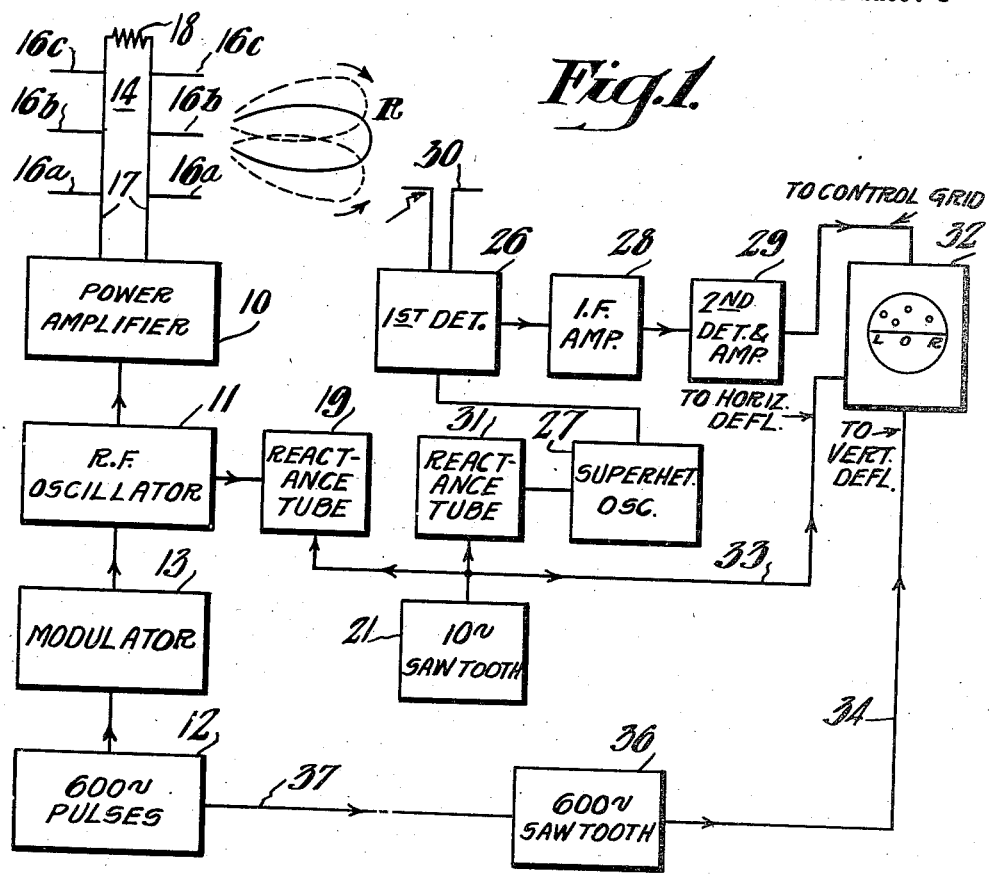

Dec. 30, 1947.　　　　　I. WOLFF　　　　　2,433,804
FREQUENCY-MODULATED PULSE RADIO LOCATING SYSTEM
Filed April 23, 1943　　　2 Sheets-Sheet 1

Inventor
Irving Wolff
By
Attorney

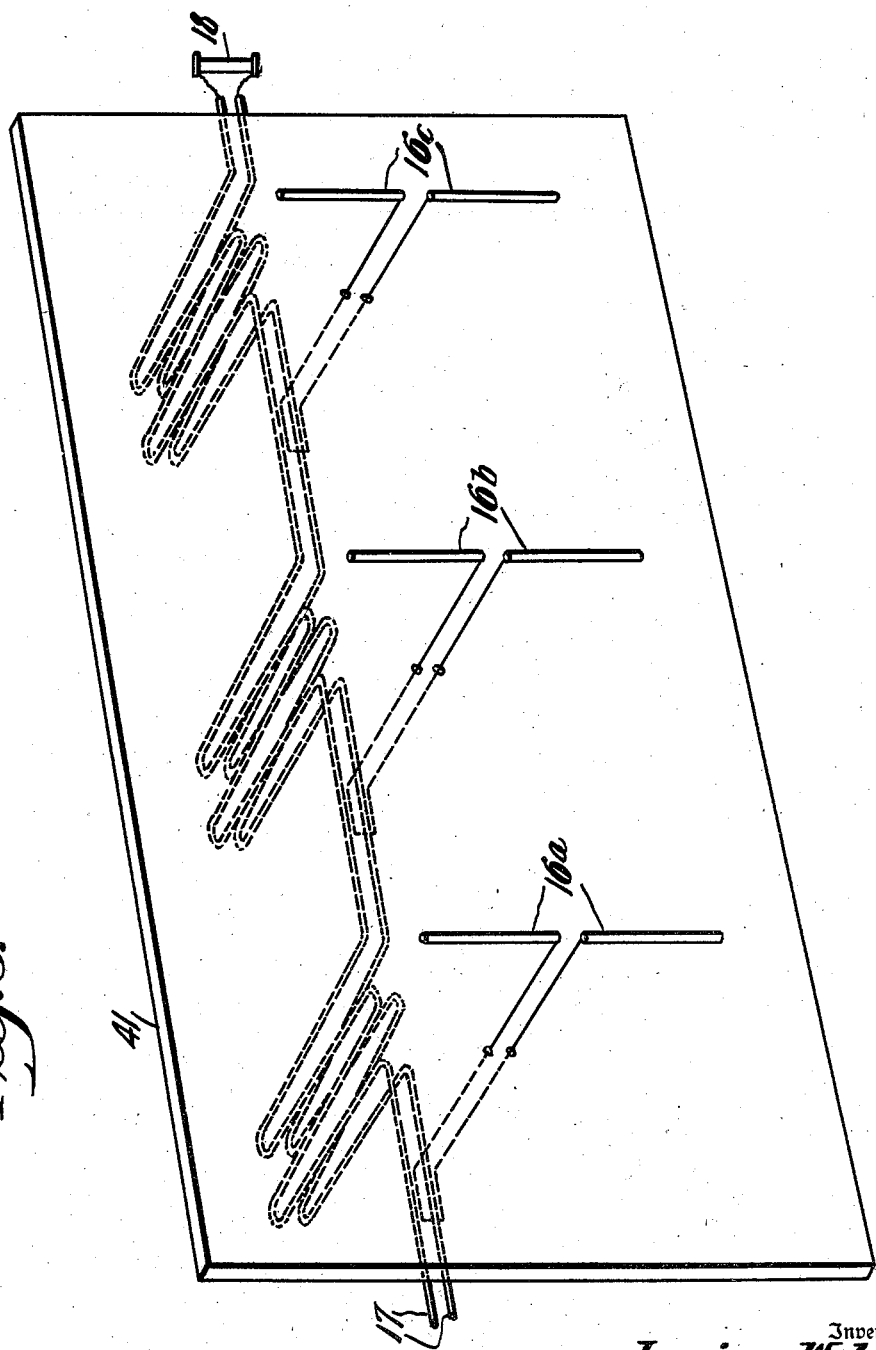

Patented Dec. 30, 1947

2,433,804

UNITED STATES PATENT OFFICE 2,433,804

FREQUENCY-MODULATED PULSE RADIO LOCATING SYSTEM

Irving Wolff, Princeton, N. J., assignor to Radio Corporation of America, a corporation of Delaware Application April 23, 1943, Serial No. 484,283

9 Claims. (Cl. 250—1.62)

My invention relates to systems for finding the direction and/or the position of an object; it relates particularly to direction and distance finding systems of the type utilizing reflected radio waves.

It is well known that the distance to an object may be determined by transmitting radio waves to the object, receiving the waves after reflection from the object, and measuring the time required for the waves to travel from the transmitter to the object and back to the receiver, the receiver usually being located near the transmitter. It is also known that the direction of the reflecting object from the transmitter may be determined by radiating the waves from an antenna system having a sharply directive radiation pattern and by turning the antenna system until its radiation pattern is directed toward the object.

An object of the present invention is to provide an improved method of and means for utilizing the above-mentioned principles of distance and direction finding for indicating the position of an object such as an aircraft or a surface ship, for example.

A further object of the invention is to provide an improved position finding system.

A still further object of the invention is to provide an improved system for determining the position of a reflecting object wherein the antenna system is stationary as distinguished from one that is rotated mechanically, for example.

In a preferred embodiment of the invention the antenna is of a type having a directional radiation pattern which may be turned or rotated through a certain angle, such as a 90-degree angle, by changing the frequency of the signal wave applied thereto. In the receiver, the cathode ray of an indicator tube may be deflected horizontally in synchronism with and in the proper time relation to the rotation of the radiation pattern while the reflected signals are applied to the indicator tube to produce a spot or other indication corresponding to the distance of the reflecting object. At the same time the cathode ray is deflected vertically in synchronism with a periodic modulation of the signal wave. Thus the location of the indicating spot along the horizontal axis gives the direction of the object from the transmitter and the height of the indicating spot above the horizontal axis gives the distance from the transmitter to the object. A system which employs a mechanically rotated antenna to give this type of indication is described and claimed in my copending application Serial No. 232,647, filed September 30, 1938, and entitled radio vision.

Figure 2:
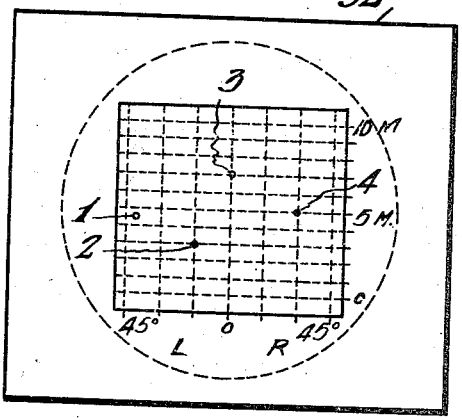

The invention will be better understood from the following description taken in connection with the accompanying drawing in which Figure 1 is a block diagram of one embodiment of the invention; Figure 2 is an enlarged view of the face of the cathode ray tube indicator which is employed in the system of Fig. 1; and Figure 3 is a diagram of an antenna that may be employed in the system of Fig. 1. In the several figures, similar parts are indicated by similar reference characters.

Fig. 1 shows the invention applied to a pulse-echo system in which the transmitter comprises a power amplifier 10, a radio frequency oscillator 11 and a pulse source 12 and modulator 13 for pulse modulating or keying the oscillator 11. The resulting pulses of R.-F. signal are radiated from a directional antenna system 14 which has the characteristic that its directional radiation will shift in direction in response to a shift in the frequency of the applied signal. This characteristic is indicated by the representations in solid and broken lines of the radiation pattern R.

The antenna 14 may consist of a plurality of spaced dipoles 16a, 16b, etc., connected to points along a transmission line 17 which preferably is provided with a non-reflecting termination by means of a resistor 18.

The frequency shift for swinging the radiation pattern through the desired angle may be obtained in various ways. In the example shown in Fig. 1, it is obtained by means of a reactance tube circuit 19 which has a periodic voltage, such as a sawtooth voltage, applied thereto from a source 21. Thus the frequency of oscillator 11 is varied periodically in accordance with the sawtooth wave, and the transmitter radiation pattern is swung or rotated through some predetermined angle in synchronism with the instantaneous amplitude of each sawtooth wave. Meanwhile the radio pulses are being transmitted. For the purpose of illustration, it is assumed that they occur at the rate of 600 per second. It will be understood that they have a duration of only a few microseconds.

The receiver preferably is of the superheterodyne type comprising a first detector 26, an oscillator 27, an I.-F. amplifier 28 and a second detector and audio amplifier represented at 29. A separate receiving antenna 30 may be employed or the antenna 14 may be used for both transmission and reception by duplexing in a well known manner. Means are provided for varying the tuning of the receiver in synchronism with the frequency shift of the transmitter output to keep the receiver tuned to the frequency of the reflected pulses. The cyclic change in tuning may be accomplished by providing the oscillator 27 with a reactance tube circuit 31 to which is applied a sawtooth voltage from the source 21.

The second detector and amplifier 29 supply 600-cycle pulses to the control grid of a cathode ray indicator tube represented at 32. The indicator tube 32 is shown only schematically since it may be a conventional cathode ray tube having horizontal and vertical deflecting plates and having a fluorescent screen.

The cathode ray is deflected horizontally and in synchronism with the rotation of the transmitter radiation pattern by means of sawtooth voltage from the source 21 which is supplied over a conductor 33 to the indicator 32. The cathode ray is deflected vertically at the 600-cycle pulse rate by sawtooth waves supplied over a conductor 34 from a sawtooth generator 36. The generator 36 is synchronized with the pulse transmitter 12 by supplying 600-cycle pulses to the generator over a conductor 37.

The vertical upward deflection begins at substantially the same time that a pulse is transmitted whereby an indicator spot appears during the upward deflection and at a position depending upon the time required for this pulse to be reflected back to the receiver. The horizontal deflection preferably begins at the time the transmitter radiation pattern begins its swing from one end of the arc through which it is swung. For example, as the radiation swings from the left to the right, the cathode ray of the indicator 32 is deflected from the left to the right of the fluorescent screen as viewed by an observer. The character of the resulting position indications is shown in Fig. 2.

It should be understood that the function of the reactance tubes 19 and 31 and the sawtooth generator 21 may be performed by mechanical means, if preferred. For example, rotating capacitors may be employed to vary the frequency of oscillators 11 and 27 and a rotating potentiometer arm may supply deflecting voltage to the horizontal deflecting plates of the indicator tube 32, the two capacitors and the potentiometer arm being rotated in synchronism.

In Fig. 2, the screen end of the cathode ray indicator tube is indicated by the broken line circle. The direction and distance scales may be marked on a mask having a square opening through which the fluorescent screen is viewed. A sheet of transparent material carrying coordinate lines may be placed over the opening. In the illustration, there are four position indications represented by the dots 1, 2, 3 and 4. The indication 3 has been produced by an object directly ahead, i. e., at the center of the angle through which the radiation pattern is swung. This object is shown to be 7 miles away. The indications 1 and 2 and the indication 4 have been produced by objects located to the left and to the right of center by the amounts indicated in degrees, and located at the distances indicated.

Fig. 3 shows in more detail a suitable antenna system for the transmitter of Fig. 1. The dipoles 16a, 16b, etc., preferably are loosely coupled to the transmission line 17. Inductive coupling is shown in this particular example. In order to increase the angle through which the radiation pattern is swung by a given frequency change, the length of the transmission line between adjacent dipoles may be increased by forming one or more loops in the line while keeping the spacing between dipoles unchanged. The antenna radiation, which is in a direction perpendicular to the plane of the dipoles, may be increased by placing a reflector 41, such as a sheet of conducting material, behind the dipole array. Also, the sharpness of the directivity pattern may be increased by utilizing a second antenna unit, for example, similar to the one illustrated and located in the same plane and underneath it. In defining the width of a radiation pattern in the claims, it is assumed that the edges of the pattern are where the signal strength is 50 percent down from the signal strength at the center of the pattern.

My invention is not limited to a system of the pulse-echo type. It may be applied to a frequency modulation system having a cathode ray indicator, a system of this type being described in my copending application Serial No. 452,990, filed July 31, 1942, and entitled Distance measuring apparatus. In such a system the frequency modulation swing for distance determination may be small compared with the frequency swing for rotating the antenna radiation pattern or the two frequency swings may be substantially the same. Separate transmitting and receiving antennas should be used in the frequency modulation type system and they preferably are similar, both being like the antenna 14 of Fig. 1.

I claim as my invention:

1. In an object locating system, a radio transmitter comprising means for producing a radio frequency signal wihch is cyclically modulated, a directive antenna having a radiation pattern which changes its direction of radiation in response to a change in the frequency of the signal applied to the antenna, means for supplying said radio signal to said antenna, radio receiving means for receiving said signal after reflection from said object, means for periodically changing the radio frequency of said signal whereby the direction of said radiation pattern is changed periodically, said receiving means having an indicating device which includes a scale and means for producing an indication which is movable relative thereto, means for producing relative movement between said indication and said scale in synchronism with the change in direction of said radiation pattern, a second scale, means for producing relative movement between said indication and said second scale in synchronism with said cyclic modulation, and means for causing a reflected signal to act upon the indication producing means to produce an indication when the indication and the second scale have moved relative to each other by an amount that is proportional to the distance to the reflecting object.

2. In an object locating system, a radio transmitter comprising means for producing a radio frequency signal which is cyclically modulated at a certain rate, a directive antenna having a radiation pattern which changes its direction of radiation in response to a change in the frequency of the signal applied to the antenna, means for supplying said modulated signal to said antenna, radio receiving means for receiving said signal after reflection from said object, means for periodically changing the radio frequency of said signal whereby the direction of said radiation pattern is changed periodically, said receiving means having a cathode ray indicating tube, means for deflecting said cathode ray in one direction in synchronism with the change in direction of said radiation pattern, means for deflecting said cathode ray in a different direction in synchronism with said cyclic modulation, and means for causing a reflected signal to produce a cathode ray indication on said tube when the cathode ray has been deflected in said different direction by an amount that is proportional to the distance to the reflecting object.

3. In an object locating system, a directive antenna having a radiation pattern which changes its direction of radiation in response to a change in the frequency of the signal applied to the antenna, means for supplying periodically recurring pulses of radio frequency energy to said antenna, radio receiving means for receiving said pulses after reflection from said object, means for periodically changing the radio frequency of said pulses whereby the direction of said radiation pattern is changed periodically, said receiving means having an indicating device which includes a scale and means for producing an index mark which is movable relative thereto, means for producing relative movement between said index mark and said scale in synchronism with the change in direction of said radiation pattern, and means for producing an indication at a point on said scale in response to the reception of a reflected pulse.

4. In an object locating system, a radio transmitter comprising means for producing periodically recurring pulses of radio frequency energy, a directive antenna having a radiation pattern which changes its direction of radiation in response to a change in the frequency of the signal applied to the antenna, means for supplying said radio pulses to said antenna, radio receiving means for receiving said pulses after reflection from said object, means for periodically changing the radio frequency of said pulses whereby the direction of said radiation pattern is changed periodically, said receiving means having a cathode ray indicating tube, means for deflecting the cathode ray of said tube in synchronism with the change in direction of said radiation pattern, and means for causing said cathode ray to produce an indication in response to the reception of a reflected pulse.

5. In an object locating system, a radio transmitter comprising means for producing pulses of radio frequency energy which recur periodically at a certain rate, a directive antenna having a radiation pattern which changes its direction of radiation in response to a change in the frequency of the signal applied to the antenna, means for supplying said radio pulses to said antenna, radio receiving means for receiving said pulses after reflection from said object, means for periodically changing the radio frequency of said pulses whereby the direction of said radiation pattern is changed periodically, said receiving means having a cathode ray indicating tube, means for deflecting said cathode ray in one direction in synchronism with the change in direction of said radiation pattern, means for deflecting said cathode ray in a different direction in synchronism with the transmission of said radio pulses, and means for causing said cathode ray to produce an indication in response to the reception of a reflected pulse.

6. In combination, a radio transmitter for producing a radio frequency carrier wave, means for cyclically modulating said carrier wave, an antenna system coupled to said transmitter for radiating said signal toward reflecting objects, said antenna system comprising a plurality of spaced radiating elements and further comprising a circuit to which said radiating elements are coupled, the electrical length of said circuit between adjacent spaced radiating elements being substantially greater than the distance between said adjacent elements whereby a change in the frequency of said carrier wave causes a change in the direction of radiation from the antenna system, and means for changing the frequency of said carrier wave periodically for changing the direction of said radiation.

7. The invention according to claim 6 wherein a receiver is provided for the reception of signals reflected from said reflecting objects and wherein means is provided for varying the tuning of the receiver synchronously with the periodic change in the frequency of said carrier wave.

8. In combination, a radio transmitter for producing a radio frequency carrier wave, means for cyclically modulating said carrier wave, an antenna system coupled to said transmitter for radiating said signal toward reflecting objects, said antenna system comprising a plurality of radiating elements which are so spaced as to provide a comparatively narrow radiation pattern and further comprising a circuit to which said radiating elements are coupled, the electrical length of said circuit between adjacent spaced radiating elements being substantially greater than the distance between said adjacent elements whereby a change in the frequency of said carrier wave causes a change in the direction of radiation from the antenna system, and means for sweeping the frequency of said carrier wave periodically through a frequency range which is sufficient to swing said radiation pattern through an angle which is greater than the angle defining the width of said pattern.

9. The invention according to claim 8 wherein a receiver is provided for the reception of signals reflected from said reflecting objects and wherein means is provided for varying the tuning of the receiver synchronously with the periodic change in the frequency of said carrier wave.

IRVING WOLFF.

REFERENCES CITED

The following references are of record in the file of this patent:

UNITED STATES PATENTS

| Number | Name | Date |
|---|---|---|
| 1,910,147 | Bruce | May 23, 1933 |
| 1,964,189 | Koomans | June 26, 1934 |
| 2,283,620 | Alford | May 19, 1942 |
| 1,922,155 | Stone | Aug. 15, 1933 |
| 2,403,728 | Loughren | July 9, 1946 |
| 2,403,729 | Loughren | July 9, 1946 |
| 1,983,079 | Hansen | Dec. 4, 1934 |
| 2,407,169 | Loughren | Sept. 3, 1946 |

FOREIGN PATENTS

| Number | Country | Date |
|---|---|---|
| 23,155/35 | Australia | June 22, 1936 |

OTHER REFERENCES

Communications, Article "A True Omnidirectional Radio Beacon," by E. N. Dingley, Jr., pages 5, 6 and 35, January, 1940.

Disclaimer 2,433,804.—*Irving Wolff*, Princeton, N. J. FREQUENCY-MODULATED PULSE RADIO LOCATING SYSTEM. Patent dated Dec. 30, 1947. Disclaimer filed June 7, 1951, by the assignee, *Radio Corporation of America*.

Hereby disclaims any construction of claims 1 to 5, inclusive, to cover a system wherein the indicator is of the PPI type; more specifically, disclaims claims 1, 2 and 5 except where they are limited to a system in which the indicator is of the B scan type, and disclaims claims 3 and 4 except where they are limited to a straight line movement or deflection of the indicator as distinguished from an angular movement.

[*Official Gazette July 10, 1951.*]